United States Patent [19]

Eldin

[11] Patent Number: 4,973,653
[45] Date of Patent: Nov. 27, 1990

[54] LINEAR POLYETHER RESINS

[75] Inventor: Sameer H. Eldin, Fribourg, Switzerland

[73] Assignee: Ciba-Geigy Corporation, Ardsley, N.Y.

[21] Appl. No.: 302,660

[22] Filed: Jan. 27, 1989

[30] Foreign Application Priority Data

Feb. 3, 1988 [CH] Switzerland ............... 382882

[51] Int. Cl.$^5$ ............ C08G 65/38; C08G 8/02; C08G 79/02; C08G 75/00
[52] U.S. Cl. .................. 528/219; 528/125; 528/167; 528/169; 528/174; 528/205
[58] Field of Search .......... 528/167, 169, 125, 174, 528/205, 219

[56] References Cited

U.S. PATENT DOCUMENTS 4,108,837  8/1978  Johnson et al. ............... 528/174
4,667,010  5/1987  Eldin ........................ 528/125

OTHER PUBLICATIONS

J. of Polymer Science: Polymer Physics Edition, vol. 19, p. 951 (1981).

Primary Examiner—Harold D. Anderson
Assistant Examiner—T. Mosley
Attorney, Agent, or Firm—JoAnn Villamizar

[57] ABSTRACT

Linear polyether resins containing 100 to 1 mol % of the repeating structural unit of formula I

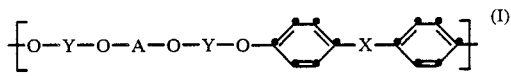

and 99 to 0 mol % of the repeating structural unit of formula II

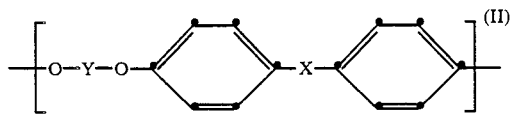

wherin A is a linear unsubstituted or methyl-substituted alkylene group containing 1 to 100 carbon atoms in the linear alkylene chain, X denotes bridging groups as defined in claim 1, and Y is an aromatic radical of a divalent phenol as defined in claim 1, are thermoplastics with high glass transition temperatures and excellent mechanical strength properties.

12 Claims, No Drawings

LINEAR POLYETHER RESINS

The present invention relates to novel polyether resins prepared from bis(hydroxyphenoxy)alkanes, to the preparation thereof, and to the moulded products or coatings produced from the novel polyether resins.

Polyether resins derived from bisphenols in which the hydroxyphenyl radicals are linked through alkylene groups are disclosed in U.S. Pat. No. 4,667,010. It has now been found that polyethers derived from bisphenols in which the hydroxyphenyl radicals are linked through α, 107 -oxyalkylene groups have higher glass transition temperatures (Tg) and appreciably greater mechanical strength properties without any disadvantages arising during the processing of the novel polyether resins.

Accordingly, the present invention relates to linear polyether resins having a specific viscosity of 0.1 to 2.5, measured at 30° C. in a 2% solution in dimethylformamide, and containing, based on the total amount of structural units present in the polyether resin, 100 to 1 mol % of the repeating structural unit of formula I

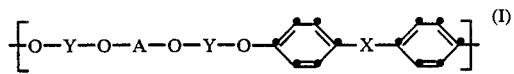

and 99 to 0 mol % of the repeating structural unit of formula II

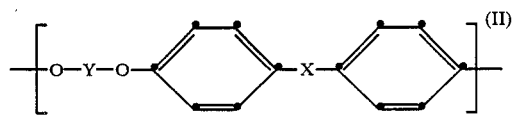

in which formulae above A is a linear unsubstituted or methyl-substituted alkylene group containing 1 to 100 carbon atoms in the linear alkylene chain, X is a member selected from the group consisting of —SO$_2$—, —CO—, —SO—, —N=N—, —CF$_2$—CF$_2$—,

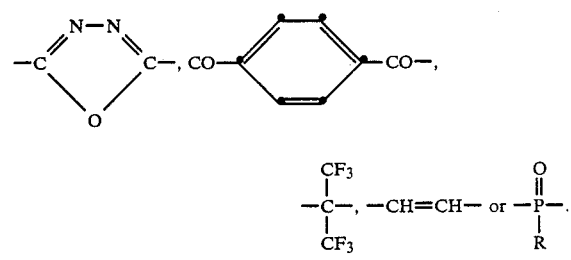

wherein R is C$_1$-C$_8$ or is

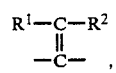

wherein each of R$^1$ and R$^2$ is a hydrogen or a halogen atom, Y is a radical of formula III or IV

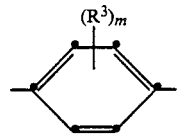

or

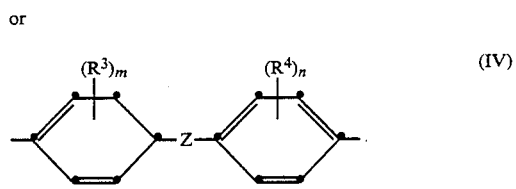

wherein m and n are each 0 or an integer from 1 to 4, R$^3$ and R$^4$ are the same or different and each is a halogen atom, unsubstituted or phenylsubstituted C$_1$-C$_4$alkyl or C$_1$-C$_4$alkoxy, and, if m and n are each 1 or 2, R$^3$ and R$^4$ are also each allyl or 1-propenyl, and Z is a direct bond or a radical selected from the group consisting of

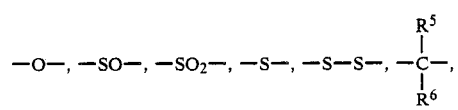

wherein each of R$^5$ and R$^6$ independently of the other is a hydrogen atom, C$_1$-C$_4$alkyl or phenyl, or is

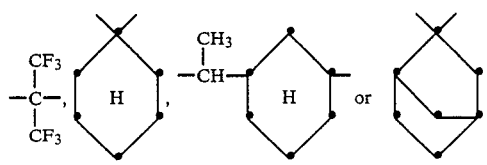

The polyether resins of the present invention preferably contain 100 to 20 mol %, most preferably 100 to 50 mol %, of the repeating structural unit of formula I, and 80 to 0 mol %, preferably 50 to 0 mol %, of the repeating structural unit of formula II.

Further, the polyether resins of this invention preferably have a specific viscosity of 0.2 to 2.0, most preferably of 0.2 to 1.5.

It is common knowledge that the specific viscosity is a reference standard for determining the molecular weight of polymers. The indicated values of the specific viscosity of 0.1 to 2.5 correspond to an average molecular weight in the range from about 1000 to 50,000.

The radical A in the structural unit of the formula I is preferably an unsubstituted alkylene group containing 1 to 20, preferably 4 to 10, carbon atoms in the linear alkylene chain.

The radical X in the structural units of the formulae I and II is preferably —SO$_2$—, —CO—, —SO—, —CF$_2$—CF$_2$—,

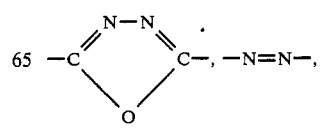

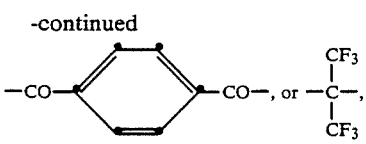

most preferably —SO$_2$— or —CO—.

The radical Y in the structural unit of formula I is preferably m- or p-phenylene, most preferably p-phenylene.

In the structural unit of formula II, Y is preferably a radical of the formula III or IV, wherein m and n are 0 and Z is a direct bond or a radical selected from the group consisting of —O—, —SO—, —SO$_2$—,

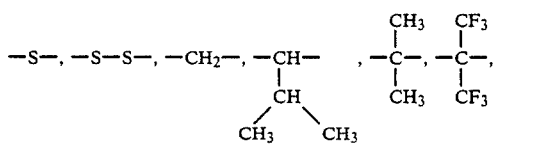

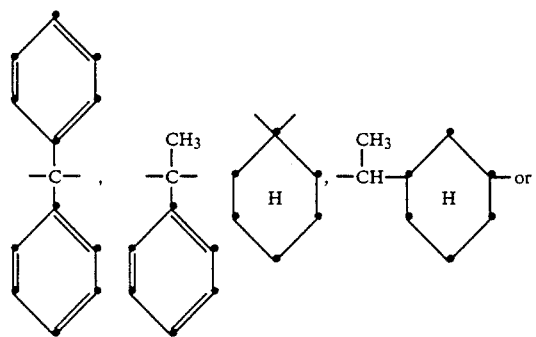

Most preferably, Y in the structural unit of formula II is a radical of formula IV, wherein m and n are 0 and Z is isopropylidene or methylene.

The polyether resins of this invention can be prepared, for example, by polycondensing a dihalo compound of formula V

in equimolar amounts, with an α, ω-bis(p-hydroxyaryloxy)alkane of formula VI

HO—Y—O—A—O—Y—OH    (VI)

or with a mixture of a compound of formula VI and a phenol contained therein in an amount of up to 99 mol %, preferably of up to 80 mol %, of the formula VII

HO—Y—OH    (VII)

wherein X, A and Y are as defined in formula I and II and Hal is a halogen atom, preferably a fluorine or chlorine atom, most preferably a chlorine atom, in the presence of alkali and in a polar aprotic solvent, until the resultant polyether resin has a specific viscosity of 0.1 to 2.5, measured at 30° C. in a 2% solution in dimethylformamide.

The particularly preferred polyether resins are prepared by polycondensing a dihalo compound of formula V with an α,ω-bis(p-hydroxyphenoxy)alkane of formula VI or a mixture of a compound of formula VI and up to 50 mol % of a phenol of formula VII contained therein, in equimolar amounts.

The expression "equimolar amounts" will be understood in this connection as meaning a molar ratio of about 0.8 to 1.2.

The polycondensation reaction is preferably carried out until the specific viscosity of the resultant polyether resins is in the range from 0.2 to 2.0, preferably from 0.2 to 1.5.

It is preferred to conduct the reaction in the presence of an entrainer, for example chlorobenzene, in order to be able to remove the water of reaction as an azeotrope from the reaction mixture.

A strong alkali such as solid sodium hydroxide or aqueous sodium hydroxide solution will normally be employed in the reaction; but it is also possible to use other alkalies such as potassium hydroxide, barium hydroxide, calcium hydroxide, sodium carbonate or potassium carbonate.

Examples of polar aprotic solvents eligible for use in the process for the preparation of the polyether resins of this invention are: dimethylsulfoxide, dimethylacetamide, diethylacetamide, tetramethylurea, N-methylcaprolactam, N-methylpyrrolidone, acetone, dioxan, ethyl acetate and tetrahydrofuran.

The dihalo compounds of formula V are known and some are commercially available. Examples of suitable compounds of formula V are: 4,4'-(dichlorodiphenylsulfone, 4,4'-difluorodiphenylsulfone, 4,4'-dichlorodiphenylsulfoxide, 4,4'-dichlorobenzophenone, 4,4'-dichloroazobenzene, 1,2-bis(p-chlorophenyl)tetrafluoroethane and 2,2-bis(p-fluorophenyl)-hexafluoropropane.

The phenols of formula VII are also known compounds, some of which are commercially available. Examples of suitable divalent phenols which can be used for the preparation of the polyether resins of this invention are: hydroquinone, methylhydroquinone, 2,3-dimethylhydroquinone, resorcinol, 4,4'-dihydroxydiphenyl, bis(4-hydroxyphenyl) ether, 4,4'-dihydroxy-2,6-dimethyldiphenyl ether, bis(4-hydroxy-3-isobutylphenyl) ether, bis(4-hydroxy-3-isopropylphenyl) ether, bis(4-hydroxy-3-chlorophenyl) ether, bis(4-hydroxy-3-fluorophenyl) ether, bis(4-hydroxy-3-bromophenyl) ether, 4,4'-dihydroxy-3,6-dimethoxydiphenyl ether, 4,4'-dihydroxy-2,5-diethoxydiphenyl ether, bis(4-hydroxypheny)sulfone, 5'-chloro-4,4'-dihydroxydiphenylsulfone, bis(4-hydroxyphenyl)methane (bisphenol F), bis(4-hydroxy-2,6-dimethyl-3-methoxyphenyl)methane, 2,2-bis(4-hydroxyphenyl)propane (bisphenol A), 2,2-bis(3-methyl-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(3,5-dibromo-4-hydroxyphenyl)propane, 2,2-bis(4-hydroxyphenyl)pentane, 3,3-bis(4-hydroxyphenyl)pentane, bis(4-hydroxyphenyl)phenylmethane, 2,2-bis(4-hydroxyphenyl)-1-phenylpropane and 2,2-bis(4-hydroxyphenyl)-1,1,1,3,3,3-hexafluoropropane, 2,2-bis(3-allyl-4-hydroxyphenyl)propane and 2,2-bis[3-(1-propenyl)-4-hydroxyphenyl]propane.

Some of the α,ω-bis(p-hydroxyaryloxy)alkanes of formula VI are known compounds. Those that are novel likewise constitute an object of the invention. The α,ω-bis(p-hydroxyphenoxy)alkanes containing 11 and more carbon atoms in the linear alkylene moiety have not yet been described in the literature.

The compounds of formula VI can be prepared, for example, by the process disclosed in the Journal of Polymer Science: Polymer Physics Edition, Vol. 19 (1981), page 956, by reacting a phenol of formula VII with an α,ω-dibromoalkane of formula VII

    (VIII)

wherein A is as defined for formula I, in the presence of sodium dithionite as catalyst, to give a compound of formula VI. Compounds of formula VIII, for example 1,4-dibromobutane, 1,6-dibromohexane or 1,8-dibromooctane, are known and some are commercially available.

The polyether resins of this invention can be employed and processed in the conventional manner for thermoplastics. They can be used for example as moulding or coating compounds or for making films. Prior to processing, conventional auxiliaries such as fillers, pigments, stabilisers or reinforcing agents, for example carbon, boron or glass fibres, can be added to the polyether resins obtained in the form of moulding powders, melts or solutions in a customary organic solvent. The polyether resins of this invention can also be processed together with other thermoplastics such as polyesters, polyamides, polyimides, polyimides, polyolefins or polyurethanes, in particular with the conventional polyether resins.

The polyether resins of the present invention preferably find utility as matrix resins for the preparation of fibrous composite structures employing, as reinforcement fibres, the fibres conventionally used for reinforcing moulding materials. These fibres may be organic or inorganic fibres, natural fibres or synthetic fibres, as for example aramide fibres, and may be in the form of bundles or continuous filaments. Exemplary of reinforcement fibres employed are glass, asbestos, boron, carbon and metal fibres, with carbon and metal fibres being preferred. Such fibres and fabrics made therefrom are commercially available.

Hence the present invention also relates to moulded products or coatings which contain a polyether resin of this invention, and to fibrous composite structures which contain reinforcing fibres and, as matrix resin, a polyether resin of this invention.

PREPARATION OF THE STARTING MATERIALS 1. p,p'-Dihydroxy-1,4-diphenoxybutane

While flushing with nitrogen, a 2.5 liter flask fitted with glass propeller mixer, condenser, thermometer and N₂ inlet, is charged with 276 g (2.5 mol) of hydroquinone, 0.5 g (2.9 mmol) of sodium dithionite and 500 ml of 94% ethanol. After heating to about 50° C., the hydroquinone goes into solution and 54 g (0.25 mol) of 1,4-dibromobutane are added. The reaction solution is heated to reflux and then a solution of 42.1 g (0.75 mol) of KOH, 40 g of ice and 160 ml of absolute ethanol is added dropwise, whereupon a white precipitate forms. The reaction solution is then kept for 10 hours under reflux. After acidification with 30% H₂SO₄, the reaction solution is diluted with 2 liters of water, heated to 70° C., then cooled to 25° C. and filtered. The filtrate is suspended in 2 liters of water and the suspension is heated to 70° C. and then cooled to 25° C. and filtered. The filter residue is dried, affording 59 g (86% of theory) of a white powder which is purified by recrystallisation from 75% ethanol.

Example 1:

While flushing with nitrogen, a 750 ml flask fitted with glass propeller mixer, condenser with water separator and N₂ inlet, is charged with 34.30 g (0.125 mol) of p,p'-dihydroxy-1,4-diphenoxybutane, 33.74 g (0.1175 mol) of p,p'-dichlorodiphenylsulfone, 135 ml of dimethyl sulfoxide and 350 ml of chlorobenzene, and the mixture is heated, with stirring, to 60°-70° C. A lightish brown solution forms at 62° C. Then 20.0 g (0.250 mol) of 50% aqueous sodium hydroxide are added, whereupon a brown, turbid solution forms. The reaction solution is further heated and, at 119° C., water and chlorobenzene are distilled off. After a total time of 2 hours the temperature is 156° C. and all the chlorobenzene has been distilled off. The temperature is kept for a further 4 hours at 155°-160° C. and then the reaction solution is cautiously diluted with 200 ml of chlorobenzene. The temperature falls to 110°-120° C., the precipitated sodium chloride is removed by filtration, and the polymer is precipitated in the mixer with methanol. After filtration, the polymer is dried at 80°-90° C. Yield: 53.7 g (78.9% of theory) of a pale yellow, flocculent polymer.

Discs with a diameter of 62 mm and a thickness of 3 mm are prepared from the polymer by heat-pressure moulding at a temperature of 140° C. and the properties are determined.

Tg (DMA*)=116° C.

impact strength (in accordance with DIN 53 435) =66.7 kJ/m².

flexural strength (in accordance with DIN 53 435)=103 N/mm².

angle of deflection (in accordance with DIN 53 435)=90°.

(*) DMA=dynamic mechanical analysis.

What is claimed is:

1. A linear polyether resin having a specific viscosity of 0.1 to 2.5, measured at 30° C. in a 2% solution in dimethylformamide, and containing, based on the total amount of structural units present in the polyether resin, 100 to 1 mol % of the repeating structural unit of formula I

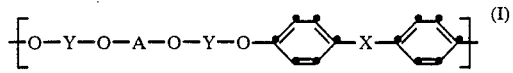

and 99 to 0 mol % of the repeating structural unit of formula II

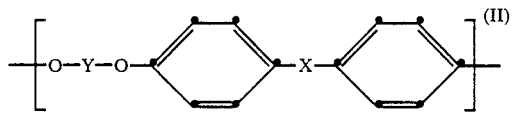

in which formulae above A is a linear unsubstituted or methyl-substituted alkylene group containing 1 to 100 carbon atoms in the linear alkylene chain, X is a member selected from the group consisting of

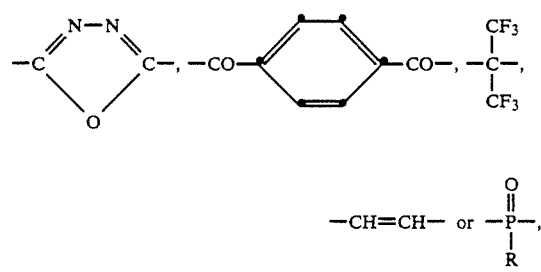

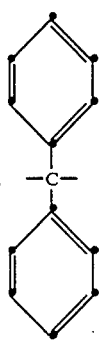

wherein R is $C_1$-$C_8$alkyl, or is

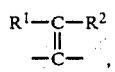

wherein each of $R^1$ and $R^2$ is a hydrogen or a halogen atom, and Y is m- or p-phenylene.

2. A polyether resin according to claim 1, which contains 100 to 20 mol % of the repeating structural unit of formula I and 80 to 0 mol % of the repeating structural unit of formula II.

3. A polyether resin according to claim 1, which contains 100 to 50 mol % of the repeating structural unit of formula I and 50 to 0 mol % of the repeating structural unit of formula II.

4. A polyether resin according to claim 1, wherein the radical A in formula I is an unsubstituted alkylene group containing 1 to 20 carbon atoms in the linear alkylene chain.

5. A polyether resin according to claim 1, wherein the radical X in formula I and II is

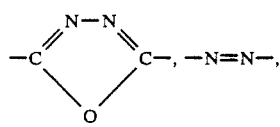

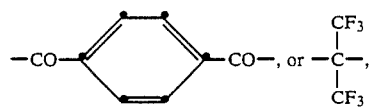

6. A polyether resin according to claim 1 wherein m and n are 0 and Z is a direct bond or Z represents a radical selected from the group consisting of —O—, —SO—, —SO$_2$—, —S—, —S—S—, —CH$_2$—,

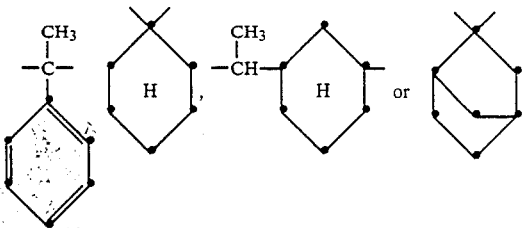

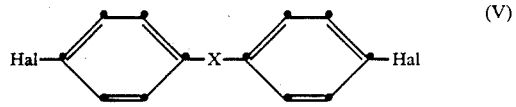

7. A polyether resin according to claim 1, said resin consisting only of the structural unit of formula I, wherein A is tetramethylene and X is sulfonyl.

8. A process for the preparation of a polyether resin according to claim 1 and containing the repeating structural units of the formulae I and II, which process comprises polycondensing a dihalo compound of formula V

in equimolar amounts, with an α,ω-bis(p-hydroxyaryloxy)alkane of formula VI

or with a mixture of a compound of formula VI and a phenol contained therein in an amount of up to 99 mol %, of the formula VII

HO—Y—OH (VII)

wherein X, A and Y are as defined in formulae I and II and Hal is a halogen atom, in the presence of alkali and in a polar aprotic solvent, until the resultant polyether resin has a specific viscosity of 0.1 to 2.5, measured at 30° C. in a 2% solution in dimethylformamide.

9. A moulded article or coating containing a polyether resin as claimed in claim 1.

10. A fibrous composite structure containing reinforcing fibres and, as matrix, a polyether resin as claimed in claim 1.

11. A polyether resin according to claim 1, wherein the radical A in formula I is an unsubstituted alkylene group containing 4–10 carbon atoms in the linear alkylene chain.

12. A polyether resin according to claim 1, wherein the radical Y in the formula I is p-phenylene.

* * * * *